United States Patent [19]

Matsumura et al.

[11] Patent Number: 4,981,939
[45] Date of Patent: Jan. 1, 1991

[54] BINDER FOR A TONER COMPRISING A POLYESTER FROM ROSIN OR HYDROGENATED ROSIN

[75] Inventors: Akira Matsumura, Suita; Sadao Shigematsu, Amagasaki; Tomiji Itou, Ogaki, all of Japan

[73] Assignee: Nippon Gohsei Kagaku Kogyo Kabushiki, Osaka, Japan

[21] Appl. No.: 397,351

[22] Filed: Aug. 23, 1989

Related U.S. Application Data

[63] Continuation of Ser. No. 119,376, Nov. 12, 1987, abandoned.

[30] Foreign Application Priority Data

Nov. 17, 1986 [JP] Japan ................... 61-273769

[51] Int. Cl.$^5$ .................... C08G 63/183; C08G 63/21
[52] U.S. Cl. .................... 527/604; 530/218; 524/270
[58] Field of Search ................ 527/604; 530/218

[56] References Cited

FOREIGN PATENT DOCUMENTS 3501-253-A 7/1985 Fed. Rep. of Germany .
3738-024-A 5/1988 Fed. Rep. of Germany .
61-188-545 4/1986 Japan .

*Primary Examiner*—John Kight, III
*Assistant Examiner*—Dennis R. Daley
*Attorney, Agent, or Firm*—Armstrong, Nikaido, Marmelstein, Kubovcik, & Murray

[57] ABSTRACT

This binder for toner preparation comprises as the main constituent thereof a polyester (X) composed of a polybasic acid component and a polyhydric alcohol component with a rosin-modified polyhydric alcohol (ab) introduced as part of the polyhydric alcohol component. The rosin-modified polyhydric alcohol is prepared in advance by reacting a polyhydric alcohol (a) having three or more hydroxyl groups with a rosin type compound (b).

1 Claim, No Drawings

BINDER FOR A TONER COMPRISING A POLYESTER FROM ROSIN OR HYDROGENATED ROSIN

This application is a continuation of application Ser. No. 119,376, filed Nov. 12, 1987, now abandoned.

BACKGROUND OF THE INVENTION

This invention relates to a binder for preparing toners which are used for developing electrostatic images formed in the process of electrophotography, electrostatography, electrostatic recording or the like.

Electrostatic images are generally developed with a toner, which occurs as a powder, to give toner images. These toner images are fixed either as they are or after transfer to a receiving paper sheet or the like.

Generally, toners are prepared by admixing a binder component and a coloring component, as necessary together with a charge control agent and other additives, melting the mixture with heating to achieve homogeneous admixture and, after cooling, comminuting the resultant mass to a desired particle size. The performance characteristics of a toner much depend on the binder component.

Various resins are known to be useful as binders for toner preparation. Recently, polyester binders have attracted much attention since they have high levels of negative chargeability and good low-temperature fixability, hence are suited for use in high-speed copying. Furthermore, they have good resistance to plasticizers. In other words, they will not cause prints or copies carrying images developed therewith to become indistinct when said prints or copies are placed in contact with a polyvinyl chloride sheet or film, for instance, and accordingly exposed to a plasticizer contained in said sheet or film.

Polyesters described as being useful as toner binders include, among others, the following: (i) Polymerization/esterification products from 1,4-benzenedicarboxylic acid and 2,2-dimethyl-1,3-propanediol as polymerized with 1,2,4-benzenetricarboxylic acid cyclic 1,2-anhydride (Japanese Kokai Tokkyo Koho No. 56(1981)-168660);

(ii) Nonlinear, low melting-point polyesters with an acid value of 10-60 as obtained from components comprising (A) an alkyl-substituted dicarboxylic acid and/or an alkyl-substituted diol, (B) a polycarboxylic acid having three or more carboxyl groups and/or a polyol having three or more hydroxyl groups, (C) a dicarboxylic acid and (D) an etherified diphenol (Japanese Kokai Tokkyo Koho No. 59(1984)-7960); and (iii) Combinations of a polyvalent metal compound and an amorphous polyester having an acid value of 10-100 as obtained by reacting an etherified diphenol propoxylated and/or ethoxylated with a propoxy group content of not less than 50% with a phthalic acid or acids containing up to 40 mole percent of an aromatic carboxylic acid having three or more carboxyl groups (Japanese Kokai Tokkyo Koho No. 59(1984)-29256).

While, as mentioned above, toners in which polyester binders are used seen to be advantageous in respect of low-temperature fixability, practical use thereof encounters a problem, namely easy occurrence of the phenomenon called offset. This offset phenomenon includes staining of the surface of the receiving sheet supplied next due to transfer of a part of toner to the heat roller and, further, staining of the back of the receiving sheet with that portion of toner further transferred to the pressure roller in contact with the heat roller under pressure.

The low-temperature fixability and the prevention of offset are, in substance, contradictory requirements. Nevertheless, to prevent occurrence of the offset phenomenon while retaining the low-temperature fixiability, which is one of the characteristic features of polyester binders, is a problem to be solved by all means before putting to practical use toners in which polyester binders are used.

The inventions (i), (ii) and (iii) cited above as belonging to the prior art are to cope with the problem mentioned above but each has its drawbacks.

Thus, the binders according to the invention (i) have certain virtually definite or invariable physical properties since they are polymerization/esterification products from specific three components. Therefore, they have their limit in that they cannot meet varied requirements in the market concerning physical characteristics.

With toners in which the binders according to the invention (ii) are used, it is intended that the fixing temperature should be prevented from rising and at the same time the freeness from offset should be secured through introduction of the alkyl-substituted dicarboxylic acid and/or alkyl-substituted diol, which constitutes a soft segment, into the polyester skeleton. However, problems are encountered on the occasion of resin production. For example, considerable skill is required in producing said polyesters for acquiring a balance between both the performance characteristics.

Toners in which the binders according to the invention (iii) are used should secure high-speed fixability and offset resistance through the combined use of a polyvalent metal compound to overstep the limits of improvements on the polyester side. However, since the cross-linking is effected with an externally incorporated polyvalent metal compound, slight deviations in mixing conditions may result in variable performance characteristics. In some instances, the combined use of a metal compound may affect the charge, or static electricity, of the toner. Therefore, it is more advantageous to solve the above problem by an improvement in the binder polyester itself.

Furthermore, it is earnestly desired in the relevant industry to have another kind of binder than the binders according to the above-mentioned inventions (i), (ii) and (iii), which has both the low-temperature fixability and offset resistance, since the range of choice might be widened accordingly so as to cope with changes of toner design.

Under these circumstances, the present invention has now been completed to solve the above problems.

SUMMARY OF THE INVENTION

The invention provides a toner which comprises as the main component a polyester (X) composed of a polybasic acid component and a polyhydric alcohol component, which are condensation components, with a polyhydric alcohol (a) having three or more hydroxyl groups and a rosin type compound (b) each introduced in said polyester as part of the respective condensation component.

In the following, the invention is described in further detail.

[Polyester (X)]

In accordance with the invention, a polyhydric alcohol (a) having three or more hydroxyl groups and a rosin type compound (b) each is introduced into the polyester polymer as part of the respective condensation component.

As the polyhydric alcohol (a) having three or more hydroxyl groups, there may be mentioned glycerol, trimethylolpropane, 1,2,6-hexanetriol, trimethyloleth-ane, pentaerythritol, dipentaerythritol, tripentaerythritol and sorbitol, among others.

As the rosin type compound (b), there may be mentioned natural rosin species (substances containing abietic acid as the main component and further containing neoabietic acid, dihydroabietic acid, tetrahydroabietic acid, d-pimaric acid, iso-d-pimaric acid, dehydroabietic acid, and so on), constituent substances thereof, isomerized rosin, dimerized rosin, polymerized rosin, hydrogenation products from these, and the like. Among them, hydrogenated rosin is most preferred.

It is particularly preferable to react the polyhydric alcohol (a) having three or more hydroxyl groups with the rosin type compound (b) in advance and introduce the resultant rosin-modified polyhydric alcohol (ab) into the polymer by charging the same as part of the relevant condensation component (polyhydric alcohol component), although both the components (a) and (b) may be introduced into the polymer by charging each a part of the polyhydric alcohol component or acid component to be subjected to condensation reaction.

In the above case, the rosin-modified polyhydric alcohol (ab) is desirably a product obtained by reacting the polyhydric alcohol (a) having three or more hydroxyl groups (the number of OH groups per molecule being n) with the rosin type compound in a mole ratio of 1 [alcohol (a)] to $(n-2)\pm(n-2)/5$ [compound (b)]. When the former is used in larger amounts, crosslinking proceeds during the condensation reaction and, as a result, the viscosity of the system rapidly increases and stirring becomes difficult to conduct. Another problem is that the fixing temperature of the resultant resin becomes high. Conversely, when the latter is used in a larger proportion, the degree of condensation does not go up to a sufficient level. As a result, the phenomenon of offset cannot be prevented to a satisfactory extent.

The reaction between the polyhydric alcohol (a) having three or more hydroxyl groups and the rosin type compound (b) is carried out at 150°–280° C. in an inert gas atmosphere in the presence of a catalyst and, as necessary, a solvent, while byproduct water is continuously removed.

The polyester (X) to be used in accordance with the invention is composed of a polybasic acid component and a polyhydric alcohol component, and the above-mentioned rosin-modified polyhydric alcohol (ab) constitutes part of the polyhydric alcohol component. It is desirable that the proportion of the rosin-modified polyhydric alcohol (ab) to the whole polyhydric alcohol component be within the range of 3-50 mole percent. When said proportion is less than 3 mole percent, the low-temperature fixability and offset-freeness remain poor. When said proportion exceeds 50 mole percent, the degree of condensation does not rise sufficiently, hence the offset-freeness required of the binder becomes short.

As the polybasic acid component, which is a constituent of the polyester (X), there may be mentioned terephthalic acid, isophthalic acid, phthalic acid, malonic acid, dimethylmalonic acid, succinic acid, glutaric acid, adipic acid, trimethyladipic acid, pimelic acid, 2,2-dimethylglutaric acid, azelaic acid, sebacic acid, fumaric acid, maleic acid, itaconic acid, 1,3-cyclopentanedicarboxylic acid, 1,2-cyclohexanedicarboxylic acid, 1,4-cyclohexanedicarboxylic acid, 2,5norbornanedicarboxylic acid, 1,4-naphthalic acid, diphenic acid, 4,4'-oxydibenzoic acid, diglycolic acid, thiodipropionic acid, 2,5-naphthalenedicarboxylic acid and the like. There polybasic acids may be in the form of acid anhydrides, esters, chlorides, etc.

Polybasic carboxylic acids having three or more carboxyl groups, such as trimellitic acid, trimellitic anhydride, pyromellitic acid, pyromellitic anhydride, 4-methylcyclohexene-1,2,3-tricarboxylic anhydride, trimesic acid, 5-(2,5-dioxotetrahydrofurfuryl)-3methyl-3-cyclohexene-1,2-dicarboxylic anhydride, may be used in small amounts in combination with the aforementioned dicarboxylic acids.

It is advantageous that such polycarboxylic acids having three or more carboxyl groups be charged subsequently to the condensation reaction between dicarboxylic acid and diol and thus be used for crosslinking reaction.

As the polyhydric alcohol component, which is another constituent of the polyester (X), other than the above-mentioned rosin-modified polyhydric alcohol (ab), there may be mentioned ethylene glycol, diethylene glycol, propylene glycol, 1,3-propanediol, 1,3-butanediol, 1,4-butanediol, 1,5-pentanediol, 1,6-hexanediol, 1,7-heptanediol, 1,8-octanediol, 1,9-nonanediol, 1,10-decanediol, 2,4-dimethyl-2-ethylhexane-1,3-diol, 2,2-dimethyl-1,3-propanediol (neopentyl glycol), 2-ethyl-2-buthyl-1,3-propanediol, 2-ethyl-2-isobutyl1,3-propanediol, 3-methyl-1,5-pentanediol, 2,2,4-trimethyl-1,6-hexanediol, 1,2-cyclohexanedimethanol, 1,3-cyclohexanedimethanol, 1,4-cyclohexanedimethanol, 2,2,4,4-tetramethyl-1,3-cyclobutanediol, 4,4'-thiodiphenol, 4,4'-methylenediphenol, 4,4'-(2-norbornylidene)-diphenol, 4,4'-dihydroxybiphenol, o-, m- and p-di-hydroxybenzene, 4,4'-isopropylidenediphenol, 4,4'-isopropylidenebis 2,6-dichlorophenol), 2,5-naphthalenediol, p-xylenediol, cyclopentane-1,2-diol, cyclohexane-1,2diol, cyclohexane-1,4-diol, and etherified diphenols such as bisphenol A-alkylene oxide adducts, and so forth. A small amount of a polyhydric alcohol having three or more hydroxyl groups may be used in combination, as the case may be.

The condensation reaction is generally carried out in an inert gas atmosphere at a temperature of 150°–280° C. under removal of byproduct water. When water no more distills off, a polybasic acid having three or more carboxyl groups, such as trimellitic anhydride, may be added to the system for the purpose of effecting crosslinking. Such crosslinking preferably improves the physical properties of the binder.

Toner preparation can be achieved by incorporating, as necessary, a charge control agent, a flowability improving agent, a release agent and a plasticizer into a mixture of the above-mentioned polyester (X) and a coloring agent (Y), melting the mixture for attaining homogeneity, and comminuting the cooled mixture to a desired particle size. A polyester toner binder other than the polyester (X) or a nonpolyester toner binder may be used in combination with the above-mentioned polyester (X) unless it is unfit for the purpose of the invention.

As the coloring agent (Y), there may be mentioned, for example, carbon black, nigrosine dyes, aniline black, Calco Oil Blue, chrome yellow, Ultramarine Blue, du Pont Oil Red, quinoline yellow, methylene blue chloride, phthalocyanine blue, malachite green oxalate, lampblack and rose bengal. Among them, carbon black is of particular importance.

Magnetic toners can be obtained by incorporating a magnetic or magnetizable material, for example a fine powder of a metal, such as iron, manganese, nickel, cobalt or chromium, ferrite or Permalloy, into the toner.

The polyhydric alcohol (a) having three or more hydroxyl groups and the rosin type compound (b), in particular the reaction product from both, namely the rosin-modified polyhydric alcohol (ab), give the polyester (X) properties that are mutually contradictory from the ordinary thermal characteristics viewpoint, namely fixability at relatively low temperature and freeness from adhesion to the heat roll.

Therefore, the toner according to the invention in which the polyester (X) is used as the main component of the toner binder together with a coloring agent (Y) and, as necessary, a charge control agent and other additives is effective in efficiently preventing the phenomenon of offset from taking place while retaining low-temperature fixability.

The fact that binders which are of a different kind from the so-far known ones and have both low-temperature fixability and offset-freeness are now available in accordance with the invention broadens the range of choice and it is now possible to cope with various requirements of the market relative to physical properties and thus meet the demand of the relevant industry.

EXAMPLES

The following examples are further illustrative of the toner binder according to the present invention. Hereinafter, "part(s)" and "%" are on the weight basis.

[Binder production]

EXAMPLE 1

(First step reaction)

A reaction vessel equipped with a nitrogen inlet, thermometer, stirrer and rectification column was charged with 5.5 moles of hydrogenated rosin, 5 moles of trimethylolpropane, 3% (based on the whole system) of xylene and 0.025% (based on the whole system) of dibutyltin oxide. After homogenizing at 120° C., the temperature was raised to 240° C. and the reaction was allowed to proceed until neither xylene nor distillate water came out any more.

(Second step reaction)

The reactor inside temperature was then lowered to 160° C., 5 moles of terephthalic acid, 5 moles of isophthalic acid, 4 moles of ethylene glycol, 3 moles of neopentyl glycol, 2 moles of bisphenol A-propylene oxide adduct and 0.0025 mole of dibutyltin oxide were added, the temperature was raised to 240° C., and the reaction was continued until no more distillate water came out. Then, the temperature was lowered against to 160° C., 2.5 moles of trimellitic anhydride was added, the temperature was raised to 240° C., and the reaction was conducted at that temperature and discontinued when the acid value reached 20 mg KOH/g.

The polyester obtained had a glass transition temperature of 65° C., a number-average molecular weight of 2,500 and a weight-average molecular weight of 125,000.

COMPARATIVE EXAMPLE 1

According to the procedure of Example 1, the second step reaction alone was conducted, while the first step reaction procedure was omitted. Ethylene glycol was used in an amount of 8.75 moles.

The polyester obtained had an acid value of 30 mg KOH/g, a glass transition temperature of 60° C., a number-average molecular weight of 3,000 and a weight-average molecular weight of 33,000.

EXAMPLE 2

(First step reaction)

reaction vessel equipped with a nitrogen inlet, thermometer, stirrer and rectification column was charged with 6 moles of rosin, 6 moles of glycerol, 3% (based on the whole system) of xylene and 0.025% (based on the whole system) of dibutyltin oxide. After homogenization at 120° C., the temperature was raised to 240° C. and the reaction was conducted until neither xylene nor distillate water came out.

(Second step reaction)

The reactor inside temperature was then lowered to 160° C., 10 moles of terephthalic acid, 6 moles of propylene glycol, 3 moles of neopentyl glycol and 0.0025 mole of dibutyltin oxide were added, the temperature was raised to 240° C., and the reaction was continued until no more distillate water came out. The temperature was lowered again to 160° C., 2 moles of pyromellitic anhydride was added, the temperature was raised to 240° C. and the reaction was continued at that temperature. When the acid value reached 30 mg KOH/g, the reaction was discontinued.

The polyester obtained had a glass transition temperature of 62° C., a number-average molecular weight of 2,000 and a weight-average molecular weight of 65,000.

COMPARATIVE EXAMPLE 2

According to the procedure of Example 2, the second step reaction alone was performed. The first step reaction was not conducted. Instead, propylene glycol was used in an amount of 11 moles.

The polyester obtained had an acid value of 30 mg KOH/g, a glass transition temperature of 60° C., a number-average molecular weight of 3,200 and a number-average molecular weight of 39,000.

EXAMPLE 3

A reaction vessel was charged with 5 moles of terephthalic acid, 5 moles of isophthalic acid, 5 moles of hydrogenated rosin, 3 moles of ethylene glycol, 3 moles of neopentyl glycol, 5.1 moles of trimethylolpropane and 0.0025 mole of dibutyltin oxide. The temperature was raised to 240° C. and the reaction was continued at that temperature. When an acid value of 20 mg KOH/g was obtained, the reaction was discontinued.

The polyester obtained had a glass transition temperature of 64° C., a number-average molecular weight of 2,700 and a weight-average molecular weight of 90,000.

COMPARATIVE EXAMPLE 3

The procedure of Example 3 was followed except that the charge of hydrogenated rosin was omitted and that trimethylolpropane was used in an amount of 0.1 mole and ethylene glycol in an amount of 8 moles.

The polyester obtained had an acid value of 20 mg KOH/g, a glass transition temperature of 59° C., a number-average molecular weight of 2,900 and a weight-average molecular weight of 15,500.

[Toner preparation and evaluation]

7 days, then cooled to room temperature, and evaluated for the retention of flowability.

[Results of evaluation for toner characteristics]

The results of evaluation for toner characteristics of toners in which the binders obtained in Examples 1–3 and comparative Examples 1–3 were respectively used are shown below in Table 1.

TABLE 1

|  | Electric charge ($\mu c/g$) | Fixation initiation temperature (°C.) | Offset onset temperature (°C.) | Glass transition temperature (°C.) | Storage stability 50° C., 7 days | Melt viscosity ps/140° C. |
| --- | --- | --- | --- | --- | --- | --- |
| Example 1 | −41.6 | 130 | >240 | 66 | Flowability retained | $2.2 \times 10^4$ |
| Comparative Example 1 | −38.9 | 160 | 190 | 58 | Slight aggregation | $8.6 \times 10^3$ |
| Example 2 | −40.5 | 130 | >240 | 63 | Flowability retained | $1.8 \times 10^4$ |
| Comparative Example 2 | −41.0 | 160 | 180 | 59 | Slight aggregation | $7.6 \times 10^3$ |
| Example 3 | −33.1 | 145 | >240 | 65 | Flowability retained | $2.1 \times 10^4$ |
| Comparative Example 3 | −30.9 | 160 | 180 | 57 | caked | $7.8 \times 10^3$ |

Toner preparation 88 parts of a polyester obtained in the above manner, 10 parts of carbon black (Mitsubishi Chemical Industries' Carbon Black No. 44) and 2 parts of polypropylene wax (Sanyo Chemical Industries' Viscol No. 550P), each in a powder form, were mixed together. The mixture was fed to a double-screw kneader (Ikegai Tekko model PCM30) and kneaded there under conditions of 140° C. and 100 revolutions per minute, then cooled by bringing it into contact with a chill roll, and roughly crushed to a particle size of not more than 0.8 mm in a hammer mill. The powder obtained was divided more finely at 200 g/hr using a supersonic jet pulverizer (Nippon Pneumatic Kogyo model LABO JET) fitted with a classifier. After classification, there was obtained a toner mass having an average particle size of 7–15 $\mu$.

Charge measurement

In an empty ball mill, there were placed 5 parts of the toner obtained in the above manner and 95 parts of iron powder (Nippon Teppun's TEFV-200/300). The mixture was stirred and the charge was measured using a blow-off powder charge measuring apparatus (Toshiba Chemical model TB-200).

Image test

An image produced in an electrostatic copier provided with a selenium photoreceptor drum was developed with a mixture of 5 parts of the toner obtained in the above manner and 95 parts of an iron powder (Nippon Teppun's EFV-150/250). The toner image was transferred to a plain paper sheet and fixed by means of a heat roll coated with a fluororesin at a peripheral velocity of 4,200 mm/min. The temperature of the heat roll was varied and the toner was evaluated for fixability on paper and tendency toward offset (adhesion of the toner to the heat roll).

Storage stability test

A 20-g portion of the above toner as placed in a tightly stoppered glass vessel was allowed to stand in a constant temperature bath maintained at 50±0.5° C. for From the data shown in Table 2, it is seen that the difference between the fixation enabling temperature and offset-causing temperature is great with the toners prepared by using the binders obtained in the examples of this invention while said temperature difference is small with the toners prepared by using the binders obtained in the comparative examples.

EXAMPLE 4

(First step reaction)

A reaction vessel equipped with a nitrogen inlet, thermometer, stirrer and rectification column was charged with 5.5 moles of hydrogenated rosin, 5 moles of trimethylolpropane, 3% (based on the whole system) of xylene and 0.025% (based on the whole system) of dibutyltin oxide. After homogenization at 120° C., the temperature was raised to 240° C., and the reaction was continued until neither xylene nor distillate water came out any more.

(Second step reaction)

Then, the vessel inside temperature was lowered to 160° C., 5 moles of terephthalic acid, 5 moles of isophthalic acid, 5 moles of ethylene glycol, 2 moles of bisphenol A-propylene oxide adduct, 2 moles of glycerol and 0.0025 mole of dibutyltin oxide were added, the temperature was then raised to 240° C., and the reaction was continued until no more distillate water came out. When the acid value reached 0.9 mg KOH/g, the reaction was discontinued.

The polyester obtained had a glass transition temperature of 62° C., a number-average molecular weight of 2,200 and a weight-average molecular weight of 77,000.

COMPARATIVE EXAMPLE 4

According to the procedure of Example 4, the second reaction step alone was conducted. The first step reaction procedure was omitted but, instead, ethylene glycol was used in an amount of 10 moles.

The polyester obtained had an acid value of 0.8 mg KOH/g, a glass transition temperature of 58° C., a number-average molecular weight of 2,000 and a weight-average molecular weight of 58,000.

Toner preparation 88 parts of the polyester obtained in the above manner, 8 parts of carbon black (Mitsubishi Chemical Industries' Carbon Black No. 44), 2 parts of polypropylene wax (Sanyo Chemical Industries' Viscol No. 550P) and 2 parts of nigrosine (Orient Kagaku Kogyo's Bontron N-01), each in a powder form, were mixed together. The mixture was fed to a double-screw kneader (Ikegai Tekko model PCM30) and kneaded there under conditions of 140° C. and 100 revolutions per minute, then cooled in contact with a chill roll, and roughly crushed to a particle size of not more than 0.8 mm in a hammer mill. The powder obtained was then divided more finely at 200 g/hr using a supersonic jet pulverizer (Nippon Pneumatic Kogyo model LABO JET) fitted with a classifier. After classificaiton, there was obtained a toner mass having an average particle size of 7–15 $\mu$.

Image test

An image produced in an electrostatic copier provided with an OPC (organic semiconductor) photoreceptor drum was developed with a mixture of 5 parts of the toner obtained in the above manner and 95 parts of an iron powder (Nippon Teppun's EFV-150/250). The toner image was transferred to a plain paper sheet and fixed by means of a heat roll coated with a fluororesin at a peripheral velocity of 4,200 mm/min. The temperature of the heat roll was varied and the toner was evaluated for fixability on paper and tendency toward offset (adhesion of the toner to the heat roll).

The results of evaluation for toner characteristics of the binders prepared by using the binders of Example 4 and Comparative Example 4, respectively, are shown in Table 2.

TABLE 2

|  | Electric charge ($^2$c/g) | Fixation initiation temperature (°C.) | Offset onset temperature (°C.) | Glass transition temperature (°C.) | Storage stability 50° C., 7 days | Melt viscosity ps/140° C. |
| --- | --- | --- | --- | --- | --- | --- |
| Example 4 | +18.5 | 130 | >240 | 61 | Flowability retained | $1.9 \times 10^4$ |
| Comparative Example 4 | +17.0 | 160 | 190 | 57 | caked | $7.5 \times 10^3$ |

What is claimed is:

1. A binder for a toner preparation which comprises as the main constituent thereof a polyester consisting essentially of the reaction product of:
   (a) the reaction product of a rosin or hydrogenated rosin with a polyhydric alcohol having three or more hydroxyl groups, wherein the molar ratio of the polyhydric alcohol having three or more hydroxyl groups to the rosin or hydrogenated rosin is $1.2 \times (n-2)$ to $0.8 \times (n-2)$ and n is the number of hydroxy groups in the polyhydric alcohol,
   (b) a polybasic acid component which comprises at least one of terephthalic acid or isophthalic acid, and
   (c) a polyhydric alcohol component, and wherein (a) comprises 3–50 mole percent of (a) and (c).

* * * * *